United States Patent
Ohrbom et al.

(10) Patent No.: US 6,992,149 B2
(45) Date of Patent: Jan. 31, 2006

(54) USE OF CARBAMATE-MODIFIED AMINOPLAST RESINS TO IMPROVE THE APPEARANCE AND PERFORMANCE OF POWDER COATINGS

(75) Inventors: Walter H. Ohrbom, Hartland Township, MI (US); Thomas S. Richards, West Bloomfield, MI (US); Timothy S. December, Rochester, MI (US); James A. Laugal, White Lake, MI (US)

(73) Assignee: BASF Corporation, Southfield, MI (US)

( * ) Notice: Subject to any disclaimer, the term of this patent is extended or adjusted under 35 U.S.C. 154(b) by 5 days.

(21) Appl. No.: 10/777,301

(22) Filed: Feb. 12, 2004

(65) Prior Publication Data

US 2005/0182189 A1    Aug. 18, 2005

(51) Int. Cl.
*C08L 61/20* (2006.01)
*C08G 12/30* (2006.01)

(52) U.S. Cl. .................. 525/428; 525/443; 525/456; 528/254; 528/256; 528/259; 524/501; 524/800

(58) Field of Classification Search ............... 525/428, 525/443, 456; 528/254, 256, 259; 524/501, 524/800
See application file for complete search history.

(56) References Cited

U.S. PATENT DOCUMENTS 6,258,898 B1 * 7/2001 Rehfuss et al. ............. 525/518
6,391,969 B1 * 5/2002 Harris et al. ................ 525/163

* cited by examiner

Primary Examiner—Duc Truong

(57) ABSTRACT

A powder coating composition comprising at least about 0.1% by weight of a reaction product of an aminoplast and a compound having one carbamate group has improved smoothness.

23 Claims, 1 Drawing Sheet

USE OF CARBAMATE-MODIFIED AMINOPLAST RESINS TO IMPROVE THE APPEARANCE AND PERFORMANCE OF POWDER COATINGS

FIELD OF THE INVENTION

The invention concerns powder coating compositions, particularly thermoset compositions for industrial or automotive applications.

BACKGROUND OF THE INVENTION

Powder coating compositions have become increasingly important because they give off very little or no volatile organic material to the environment when cured. Typically, any such emissions are limited to by-products of the curing reaction, such as blocking agents or volatile condensation by-products. Powder coatings have found use as both decorative coatings and protective coatings.

Topcoats for automotive and other industrial applications may be one-layer coatings, in which the color is generally uniform through the coating layer, or clearcoat-basecoat composite coatings, having a colored basecoat layer underlying a transparent clearcoat layer. Clearcoat-basecoat composite coatings, including "tri-coat" systems of clearcoat-interference coat-ground (or color) coat, are widely used in the coatings art and are notable for desirable gloss, depth of color, distinctness of image and/or special metallic effects. Composite systems are particularly utilized by the automotive industry to achieve a mirror-like, glossy finish with a high depth of image. All of the coating layers, including the underlying primer layer or layers, should be as smooth as possible to attain the best depth of image.

It is challenging to obtain such a high degree of smoothness using a powder coating. While solventborne and waterborne coatings may be formulated with materials with low glass transition temperatures, such materials are avoided for powder coatings so that the coating will not sinter. Further, organic solvents or cosolvents in the liquid coatings provide flow and leveling when the coating coalesces and cures. It is difficult to achieve the same appearance using a powder coating. Powder slurry coatings allow application using the same methods as liquid coatings, but, again, the liquid medium of a powder slurry coating does not solvate the dispersed powder and (to a large extent) does not plasticize or provide flow of the powder coating during the bake. Thus, an object of the invention is to provide a powder coating composition that produces a coating layer with exceptional smoothness.

SUMMARY OF THE INVENTION

The present invention provides a powder coating composition containing at least about 0.1% by weight, preferably up to about 40% by weight, based on the total powder coating weight, of an aminoplast that has been modified by reaction with a compound having one carbamate group. The powder coating further includes a solid, thermosettable material and, if appropriate, a crosslinker reactive with the thermosettable material.

An aminoplast for purposes of the invention is a material obtained by reaction of an activated nitrogen with a lower molecular weight aldehyde forming an alkylol group, optionally further reacted with an alcohol (preferably a mono-alcohol with one to four carbon atoms) to form an ether group.

The powder coating may optionally be a slurry powder coating, in which solid coating material particles, containing at least about 0.1% by weight, preferably up to about 40% by weight of the aminoplast reacted with the mono-carbamate compound, are dispersed in a continuous liquid medium selected from aqueous media and organic media, particularly water or reactive diluent materials or low viscosity thermosettable resins.

The aminoplast modified with the mono-carbamate compound provides a powder coating composition or powder slurry coating composition with a surprisingly smooth appearance. The modified aminoplast may also participate in curing the coating layer under appropriate conditions through self-condensation or reaction with active hydrogen groups.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
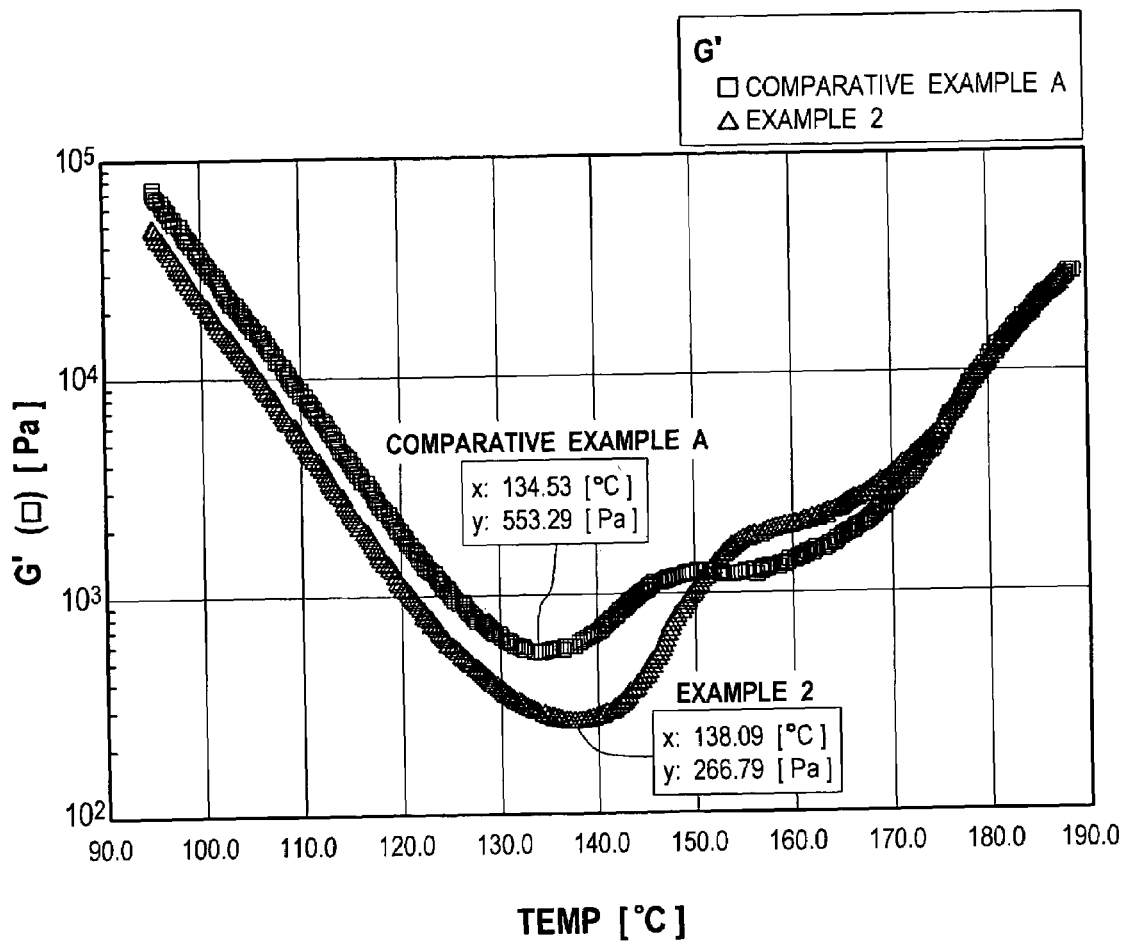
FIG. 1 is a graph of G' vs. temperature of samples of Example 2 of the invention and Comparative Example A as tested using a Rheometric Scientific SR-2000 Rheometer.

The following description of the preferred embodiment(s) is merely exemplary in nature and is in no way intended to limit the invention, its application, or uses.

The powder coating composition includes at least about 0.1% by weight, preferably up to about 40% by weight, based on the total powder coating weight, of an aminoplast that has been modified by reaction with a compound having one carbamate group and no other groups reactive with the aminoplast. In certain preferred embodiments, the powder coating composition preferably includes at least about 1% by weight, more preferably at least about 3% by weight of the aminoplast that has been modified by reaction with a compound having one carbamate group and preferably up to about 20% by weight, more preferably up to about 15% by weight of the aminoplast that has been modified by reaction with a compound having one carbamate group.

The modified aminoplast is a reaction product of a monofunctional carbamate compound with an aminoplast according to the invention. An aminoplast for purposes of the invention is a material obtained by reaction of an activated nitrogen with a lower molecular weight aldehyde, optionally further reacted with an alcohol (preferably a mono-alcohol with one to four carbon atoms) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups. A "carbamate group" as used in connection with the present invention refers to a group having a structure:

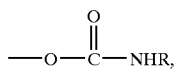

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is a primary carbamate group.

The activated nitrogen is reacted with a lower molecular weight aldehyde. The aldehyde may be selected from formaldehyde, acetaldehyde, crotonaldehyde, benzaldehyde, or other aldehydes used in making aminoplast resins, although formaldehyde and acetaldehyde, especially formaldehyde, are preferred. The activated nitrogen groups are at least partially alkylolated with the aldehyde, and may be fully alkylolated; preferably the activated nitrogen groups are fully alkylolated. The reaction may be catalyzed by an acid, e.g. as taught in U.S. Pat. No. 3,082,180, the contents of which are incorporated herein by reference.

The alkylol groups formed by the reaction of the activated nitrogen with aldehyde may be partially or fully etherified with one or more monofunctional alcohols. Suitable examples of the monofunctional alcohols include, without limitation, methanol, ethanol, propanol, isopropanol, butanol, isobutanol, tert-butyl alcohol, benzyl alcohol, and so on. Monofunctional alcohols having one to four carbon atoms and mixtures of these are preferred The etherification may be carried out, for example, by the processes disclosed in U.S. Pat. Nos. 4,105,708 and 4,293,692, the disclosures of which are incorporated herein by reference.

It is preferred for the aminoplast to be at least partially etherified, and especially preferred for the aminoplast to be fully etherified. The preferred compounds have a plurality of methylol and/or etherified methylol groups, which may be present in any combination and along with unsubstituted nitrogen hydrogens. Fully etherified melamine-formaldehyde resins are particularly preferred, for example and without limitation hexamethoxymethyl melamine.

Other preferred aminoplasts are alkylolated polycarbamate compounds, partially or preferably fully etherified. The carbamate groups of a carbamate compound having at least one primary carbamate group or at least two secondary carbamate groups are reacted first with an aldehyde, then with the optional alcohol, as already described. Illustrative examples of suitable polycarbamate compounds include, without limitation, 1,4-butanedicarbamate, 1,6-hexanedicarbamate, polymers such as polyester, polyurethane, and acrylic polymers having a plurality of carbamate groups, and any of those polycarbamate compounds described in U.S. Pat. Nos. 6,160,058, 6,084,038, 6,080,825, 5,994,479, the disclosures of which are incorporated by reference. For example, the polycarbamate compound may be the reaction product of (1) an hydroxyl group of a first compound that is the result of a ring-opening reaction between a compound with two epoxy groups and a compound with an organic acid group and (2) cyanic acid or a carbamate group-containing compound.

In another embodiment, the polycarbamate compound may be a carbamate-functional material that is the reaction product of (1) a compound comprising at least one primary carbamate group and an active hydrogen group that is reactive with (2), and (2) a lactone or an hydroxy carboxylic acid. In a particularly preferred embodiment, the active hydrogen group of compound (1) is an hydroxyl group and the compound (2) is ε-caprolactone. Examples of compound (1) include, without limitation, hydroxyethyl carbamate, hydroxypropyl carbamate, and hydroxybutyl carbamate.

In another embodiment, the carbamate compound may be a carbamate-functional material that is the reaction product of a first material (A) that is prepared by reacting (1) a compound comprising a primary carbamate group and an hydroxyl group and (2) a lactone or a hydroxy carboxylic acid, as just described, further reacted with a second material (B) that is reactive with hydroxyl groups on a plurality of molecules of compound (1), but that is not reactive with the carbamate group on compound (1). For example, the compound (B) may be a polyisocyanate, especially an isocyanate, particularly the isocyanurate of isophorone diisocyanate. Again, the compound (2) is preferably ε-caprolactone.

In yet another embodiment, the carbamate material may be a carbamate-functional material that is the reaction product of a first material (A) that is prepared by reacting (1) a compound comprising a primary carbamate group and an hydroxyl group and (2) a lactone or a hydroxy carboxylic acid, as just described, further reacted with a second material or materials (B) that converts an hydroxyl group on the reaction product to a carbamate group, or a component comprising a group that is reactive with a hydroxyl group and a carbamate or urea group or group that can be converted to carbamate or urea. The hydroxyl group can be reacted, for example, without limitation, with monoisocyanates such as methyl isocyanate and butyl isocyanate, which react to form a secondary carbamate group; cyanic acid (which can be formed by the thermal decomposition of urea), which reacts with hydroxyl groups to form a primary carbamate group; or phosgene, followed by reaction with ammonia (primary carbamate group) or a primary amine (secondary carbamate group).

In another embodiment, the carbamate material may be the reaction product of (1) a compound comprising a primary carbamate and an hydroxyl group and (2) a compound that is reactive with hydroxyl groups on a plurality of molecules of compound (1), but that is not reactive with the carbamate or terminal urea groups on compound (1). The compound (1) may be, for example and without limitation, hydroxyethyl carbamate, hydroxypropyl carbamate, or hydroxybutyl carbamate. The compound (2) is preferably a diisocyanate, triisocyanate, isocyanurate or biuret thereof, mixture of such compounds. Particularly preferred compounds (2) are the isocyanurate of isophorone diisocyanate and the isocyanurate of hexamethylene diisocyanate.

In another preferred embodiment, the carbamate material may be a reaction product of (1) a first material that is the reaction product of a mixture including at least a polyisocyanate and an active hydrogen-containing chain extension agent with (2) a compound comprising a group that is reactive with said first material and a primary carbamate or group that can be converted to a primary carbamate group. Suitable examples of the material (1) include, without limitation, the reaction product of a mixture including at least one of a diisocyanate, triisocyanate, isocyanurate or biuret thereof, mixture of such compounds, and at least one chain extension agent selected from 1,6-hexanediol, cyclohexanedimethylol, 2-ethyl-1,6-hexanediol, 3-hydroxy-2,2-dimethylpropyl 3-hydroxy-2,2-dimethylpropionate, 1,4-butanediol, and mixtures thereof. Suitable examples of compound (2) include, without limitation, hydroxyethyl carbamate, hydroxybutyl carbamate, hydroxypropyl carbamate, and combinations of these.

In a preferred embodiment, the carbamate material may be a material as described in Ohrbom et al., U.S. Pat. No. 6,541,594, filed Dec. 19, 2000 and issued Apr. 1, 2003, incorporated herein by reference, having at least two carbamate groups, preferably two to four carbamate groups, and more preferably two carbamate groups and a hydrocarbon moiety with about 24 to about 72 carbon atoms, preferably about 36 to about 72 carbon atoms, and more preferably about 36 to about 54 carbon atoms, and particularly preferably about 36 carbon atoms. The hydrocarbon moiety may include cycloaliphatic or aromatic structures. Such materials may be prepared, for example, by addition reaction of unsaturated monofunctional fatty acids having 12 to 18 carbon atoms according to known methods, followed by conversion of the acid group to a carbamate group. The unsaturated fatty acids may be dimerized, trimerized, or tetramerized. Higher oligomer products are also possible, but not preferred. The acid groups may be converted to primary carbamate groups by a number of known means. For example, the acid may be reduced to an alcohol group and then the alcohol group reacted with a hydroxy carbamate or urea compound such as hydroxypropyl carbamate or hydroxyethylene ethyl urea to introduce the carbamate functionality. Another method of synthesis involves reaction of an hydroxyl group with cyanic acid (which may be formed by the thermal decomposition of urea). An hydroxyl group can also be reacted with phosgene and then ammonia to form a primary carbamate group.

Preferred examples of such materials include compounds of the following structures:

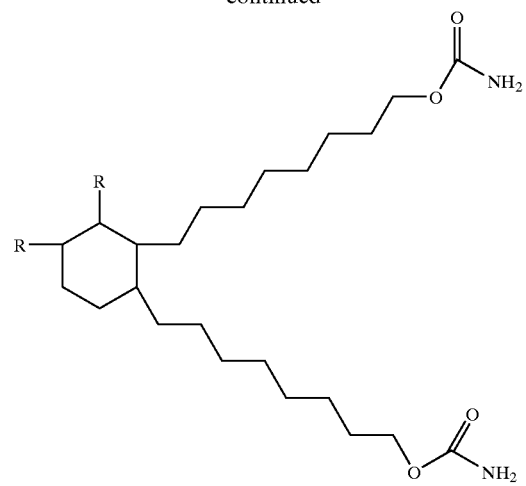

-continued

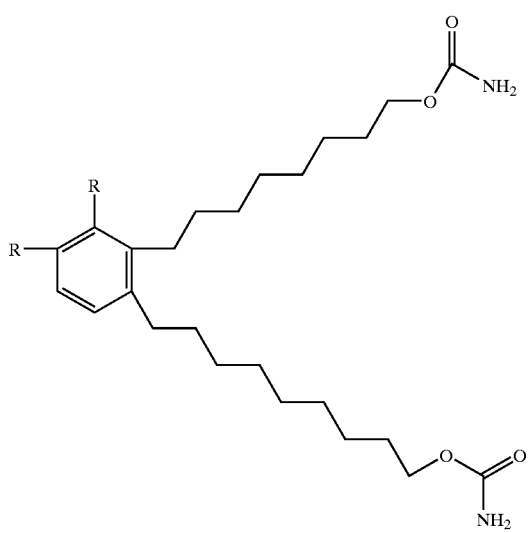

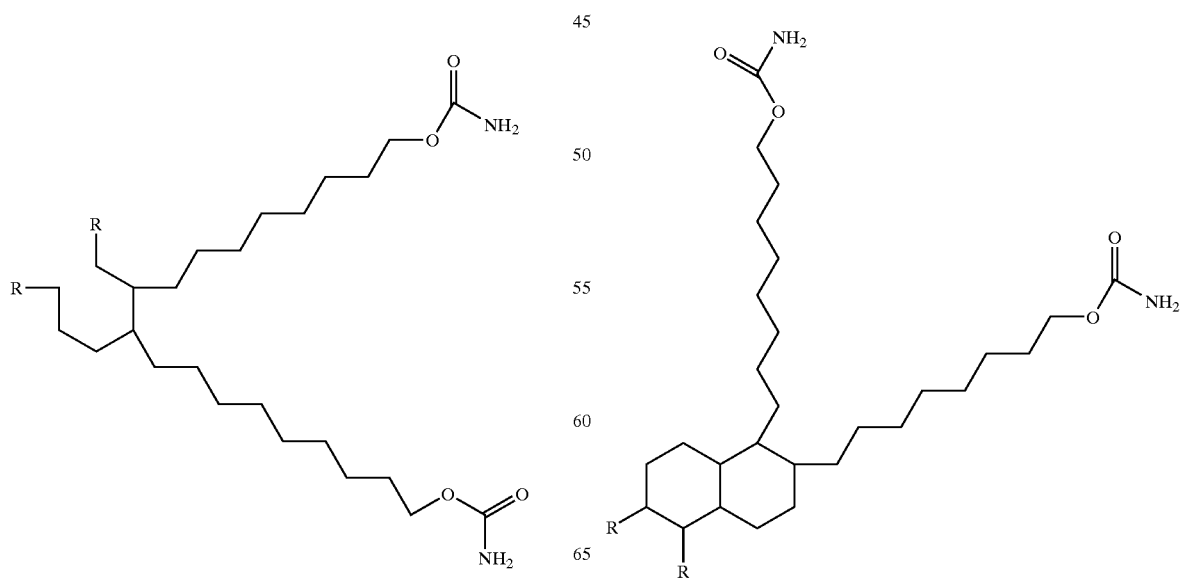

-continued

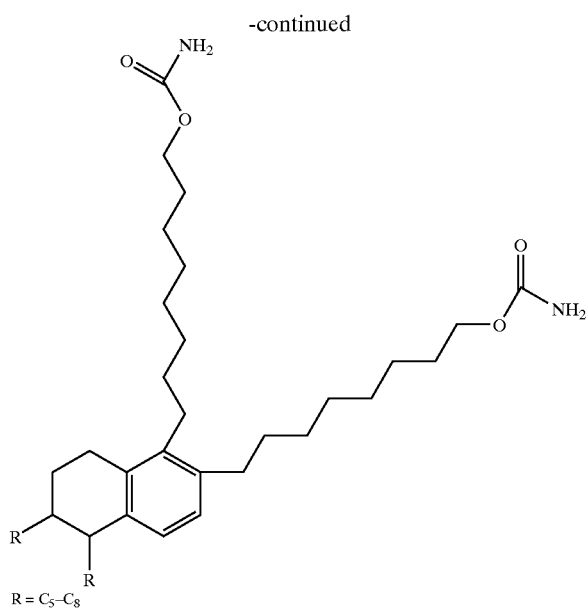

R = C₅–C₈ wherein each R group is independently an alkyl of 5 to 8 carbon atoms.

In preparing the aminoplast from any of the carbamate materials, the carbamate groups are reacted first with an aldehyde, then with the optional alcohol, as already described.

The modified aminoplast may be formed by reacting the alkylolated- and/or etherified aminoplast with a monofunctional carbamate compound. At least one monofunctional carbamate compound is reacted onto the aminoplast molecule; preferably, each activated nitrogen group is reacted with one, and preferably with two monofunctional carbamate molecules. Suitable examples of monofunctional carbamates include, without limitation, methyl carbamate, ethyl carbamate, and propyl carbamate. The reaction may be carried out at temperatures about 40° C. to about 150° C., preferably from about 50° C. to about 100° C., optionally with a suitable catalyst such as para-toluene sulfonic acid.

As an example, when the alkylolating aldehyde is formaldehyde, and the modifying monocarbamate compound is a primary carbamate compound (R=H), the modified aminoplast groups may be (N* denoting the activated nitrogen):

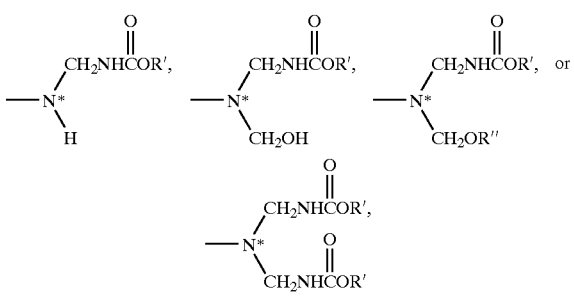

wherein R″ is preferably alkylene of one to four carbon atoms and R′ is the residue of the monocarbamate compound.

The modified aminoplast is preferably a crystalline or glassy solid at room temperature, with a softening point of at least about 20° C., and preferably at least about 40° C. A liquid modified aminoplast may, however, be incorporated into the powder coating at low levels, e.g. less than 1% by weight (depending, e.g., on its viscosity) via a masterbatch. Lower amounts of the modified aminoplast can be employed as a flow additive, but larger amounts may be incorporated, particularly when the modified melamine reacts with itself or with a further component of the powder coating.

The powder coating further includes a solid, crosslinkable material and, when appropriate, a crosslinker reactive with the crosslinkable material. Known thermosetting powder coating chemistries include, without limitation, combinations of acid functional and epoxy functional materials, combinations of acid anhydride functional and epoxy functional materials, combinations of beta-hydroxy amide functional and epoxy functional materials, acetoacetate functional materials and aminoplasts, carbamate functional materials and aminoplasts, combinations of hydroxyl functional materials and blocked isocyanate functional materials, combinations of hydroxyl functional materials and aminoplasts, combinations of hydroxyl functional materials and silane functional materials, and radiation curable materials (e.g., polyacrylates), as well as combinations of these in which the powder coating cures by more than one type of reaction. The thermosetting, film-forming components ("vehicle") should be substantially solid, although small amounts of liquids can be incorporated via a materbatch. ("Solid" refers to materials that are solid at 20° C.) The crosslinkable material and/or crosslinker may have groups reactive with the modified aminoplast, or the crosslinkable material and crosslinker may react to produce groups reactive with the modified aminoplast. As an example of the latter situation, a reaction of an epoxide group with an acid group produces an hydroxyl group, that would be reactive toward alkylol or alkyloxy groups of the modified melamine.

In one embodiment, the vehicle may include a solid polyester. Solid polyesters may, for example, be acid-functional or hydroxyl-functional. Many polyester resins are commercially available as powdered resins, such as those available under the trademark ALFTALAT from UCB; under the trademark GRILESTA from EMS-American Grilon, Inc., Sumter, S.C.; under the trademark ALBESTER from Eastman, and under the trademark ARAKOTE from CIBA-Geigy Corp., Ardsley, N.Y. The methods of making polyester resins are well-known. Typically, a polyol component and an acid and/or anhydride component are heated together, optionally with a catalyst, and usually with removal of the by-product water in order to drive the reaction to completion. The polyol component has an average functionality of at least about two. The polyol component may contain mono-functional, di-functional, tri-functional, and higher functional alcohols. Diols are preferred, but when some branching of the polyester is desired, higher functionality alcohols are included. Illustrative examples include, without limitation, alkylene glycols and polyalkylene glycols such as ethylene glycol, propylene glycol, diethylene glycol, triethylene glycol, and neopentyl glycol,; 1,4-butanediol, 1,6-hexanediol, 1,4-cyclohexane dimethanol, glycerine, trimethylolpropane, trimethylolethane, pentaerythritol, 2,2,4-trimethyl-1,3-pentanediol, hydrogenated bisphenol A, and hydroxyalkylated bisphenols. The acid and/or anhydride component comprises compounds having on average at least two carboxylic acid groups and/or anhydrides of these. Dicarboxylic acids or anhydrides of dicarboxylic acids are preferred, but higher functional acid and anhydrides can be used when some branching of the polyester is desired. Suitable polycarboxylic acid or anhydride compounds include, without limitation, those having from about 3 to about 20 carbon atoms. Illustrative examples of suitable compounds include, without limitation, phthalic acid, isophthalic acid, terephthalic acid, hexahydrophthalic acid, tetrahydrophthalic acid, pyromellitic acid, succinic acid, azeleic acid, adipic acid, 1,4-cyclohexanedicarboxylic acid, dodecane-1,12-dicarboxylic acid, citric acid, trimellitic acid, and anhydrides thereof.

The vehicle may comprise an epoxy resin. Examples of useful epoxy resins are those having an epoxy equivalent weight of from about 500 to about 2000, preferably from about 600 to about 1000. Illustrative examples of useful epoxy resins include, without limitation, bisphenol A type resins, bisphenol F type resins, novolac epoxy resin, and alicyclic epoxy resins. A number of such epoxies are available commercially for powder coatings, for example from Dow Chemical Co., Midland, Mich. under the trademark D.E.R.; from Huntsman under the trademark ARALDITE; and from Resolution under the trademark EPON.

The vehicle may comprise a vinyl and/or acrylic resin. Examples of suitable vinyl and acrylic resins typically have a glass transition temperature of from about 25° C. to about 80° C., preferably from about 40° C. to about 60° C. Useful acrylic resins may have one or more of the following functional groups: carboxyl groups, anhydride groups, hydroxyl groups, blocked isocyanate groups, epoxide groups, and amine groups. When the acrylic resin is hydroxyl functional, it may have a hydroxyl number of from about 20 to about 120 mg KOH/g. Acid functional acrylic resins may have an acid number of from about 20 to about 100 mg KOH/g. Epoxide-functional resins may have an epoxide equivalent weight of from about 200 to about 800. In general, the equivalent weight of the acrylic polymer is preferably from about 200 to about 1000, more preferably from abut 400 to about 900. Preferably, the acrylic resin has a weight average molecular weight of from about 6000 to about 40,000, more preferably from about 10,000 to about 25,000.

The desired functionality is usually introduced to the vinyl or acrylic polymer by copolymerizing a monomer having that functionality, but the functionality may also be added after the polymerization reaction, as in the case of hydrolysis of vinyl acetate groups to hydroxyl. Examples of functional monomers include, without limitation, hydroxyethyl acrylate, hydroxypropyl acrylate, hydroxybutyl acrylates, hydroxyethyl methacrylate, hydroxypropyl methacrylate, hydroxybutyl methacrylates, t-butylaminoethyl methacrylate, glycidyl acrylate, glycidyl methacrylate, allyl glycidyl ether, acrylic acid, methacrylic acid, crotonic acid, itaconic acid, maleic acid, fumaric acid, maleic anhydride, itaconic anhydride, isocyanatoethyl methacrylate, 1-(1-isocyanato 1-methylethyl)-3-(1-methylethyenyl)benzene, and soon. Isocyanate groups may be blocked before polymerization of the monomer if desired, but the blocking can be done at any point. There are many suitable comonomers, including, without limitation, non-functional acrylic and methacrylic esters derived from alcohols having up to about 20 carbon atoms; vinyl esters, other vinyl compounds such as styrene, vinyl toluene, vinyl ethers, allyl ethers, and so on. Particular compounds that may be mentioned are methyl methacrylate, propyl methacrylate, butyl methacrylate, ethyl acrylate, styrene, methylstyrene, vinyltoluene, acrylamide, acrylonitrile and methacrylonitrile, vinyl halides and vinylidene halides, vinyl acetate, vinyl propionate, and so on. Combinations of comonomers may, of course, be used.

Preferred curing agents include solid aminoplasts and blocked isocyanate resins including, without limitation, blocked isocyanurates, blocked biurets, blocked allophanates, uretdione compounds, and blocked isocyanate-functional prepolymers such as the reaction product of one mole of a triol with three moles of a diisocyanate.

Other preferred curing agents include solid epoxide-functional epoxy resins and acrylic resins, as well as solid monomeric polyfunctional epoxide compounds such as triglycidyl isocyanurate, polyoxazolines, and polydioxanes; solid polyamines; and solid polyacid compounds, such as dodecanedioic acid. More than one kind of curing agent may be used for curing mechanisms employing mixed chemistries.

Weight ratios of vehicle materials may vary widely. Typical ratios when a curable resin and curing agent combinations is used are from about 15% by weight to about 85% by weight of the curable resin, preferably 30% by weight to about 70% by weight of the curable resin, based on the combined weights of curable resin and curing agent.

It may be desirable to incorporate into the powder coating composition other materials, such as fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers, antioxidants, processing aids, anti-blocking agents, anti-cratering agents such as fumed silica, clay, talc, fumed alumina, and precipitated silica, and/or catalysts. Moreover, a texturing agent may also be included, for example to more finely adjust the degree of texture.

Pigments and fillers, if used, may be utilized in amounts typically of up to 50% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, and lead molybdate. Special effect pigments may be incorporated to produce a "metallic effect" or gonioapparent appearance, for example and without limitation metal flake pigments, including aluminum pigment, colored aluminum pigments, and bronze pigment, and pearlescent mica flake pigments, and other pearlescent pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Dyes may also be used, particularly for tinted clearcoat coating compositions.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 50° C. to 120° C.

The extrudate is then cooled and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The powder coating may also be a powder slurry coating composition, which may be prepared, for example and without limitation, as described in Sacharski et al., U.S. Pat. No. 6,360,974, fled May 19, 1999 and issued Mar. 26, 2002. Other methods of preparing powder slurry coating compositions, including those in which the continuous medium is aqueous and those in which the continuous medium is a reactive diluent in which the powder coating particles are insoluble, are also known and may be employed.

The thermosetting powder coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions.

Application can be, for example, by electrostatic spraying or by use of a fluidized bed. Electrostatic spraying is the preferred method. The coating powder can be applied in one or more passes to provide a film thickness after cure of typically from about 20 to about 100 microns. The substrate can optionally be preheated prior to application of a powder coating composition to promote uniform and thicker powder deposition. Powder coating slurry compositions may be applied by the usual application methods for liquid coating compositions.

After application of the coating composition to the substrate, the coating is cured, preferably by heating at a temperature and for a length of time sufficient to cause the reactants to form an insoluble polymeric network. The cure temperature is usually from about 120° C. to about 260° C., and the length of cure is usually about 15 minutes to about 60 minutes. The cure conditions depend on the cure chemistry; for example, radiation curable coatings will be exposed to UV light, electron beams, or other radiation to effect cure. A powder slurry coating composition may be given an initial "flash" after application, e.g. for about 5 minutes at about 50° C., to help remove the continuous medium. In general, the applied powder coating is heat to a high enough temperature to coalesce the film and, depending on the cure chemistry, to develop an adequate cure.

The powder coating composition of the invention can be formulated as a primer coating composition, a basecoat coating composition, interference coating composition, or a clearcoat coating or tinted clear coating composition. Basecoat coating compositions include appropriate pigments to provide the desired color and/or special effect to the coating layer. Clearcoat coating compositions do not include opaque pigments.

The invention is further described in the following example. The examples are merely illustrative and do not in any way limit the scope of the invention as described and claimed. All parts are parts by weight unless otherwise noted.

EXAMPLES

Example 1

Example of Modified Aminoplast of the Invention

A mixture of 53.4 parts by weight of Cymel 300 (obtained from Solutia), 15.9 parts by weight of methyl carbamate, 30.4 parts by weight of methanol, and 0.0015 parts by weight of para-toluene sulfonic acid was heated under an inert atmosphere to reflux. Once at reflux the stream of inert gas was turned off. The reaction mixture was maintained at reflux until the reaction was complete, as determined by gas chromatographic analysis for methyl carbamate amount remaining. After the reaction was complete, 0.0006 parts of aminopropanol was added. The reaction mixture was then subjected to vacuum stripping, keeping the temperature below about 93° C., to obtain the product, which was solid at room temperature.

Example 2

Example of Coating Composition of the Invention

The following materials were melt mixed in an extruder: 564.8 parts by weight of Alftalat 03233 (a polyester available from UCB), 50.22 parts by weight of the modified aminoplast of Example 1, 72.12 parts by weight Alcure 4470 (a triazole-blocked polyisocyanate available from Eastman), 5.17 parts by weight benzoin, 10.35 Estron PL 200, 48.28 parts by weight Almatex Anderson epoxide-functional acrylic polymer, 9.66 parts by weight dodecanedioc acid, 82.83 parts by weight titanium dioxide, 1.26 parts by weight carbon black, 51.77 parts by weight calcium metasilicate, and 103.54 parts by weight barium sulfate filler. The mixture was extruded and the extrudate was pulverized and ground to a median particle size of about 25 microns.

Comparative Example A

The following materials were melt mixed in an extruder: 605.62 parts by weight of Alftalat 03233 (a polyester available from Solutia), 77.31 parts by weight Alcure 4470 (a triazole-blocked polyisocyanate available from Eastman), 5.17 parts by weight benzoin, 10.35 Estron PL 200, 51.77 parts by weight Almatex Anderson epoxide-functional acrylic polymer, 10.35 parts by weight dodecanedioc acid, 82.83 parts by weight titanium dioxide, 1.26 parts by weight carbon black, 51.77 parts by weight calcium metasilicate, and 103.54 parts by weight barium sulfate filler. The mixture was extruded and the extrudate was pulverized and ground to a median particle size of about 25 microns.

Testing of Examples

The powder coating compositions of Example 2 and Comparative Example A were applied to steel panels and baked for about 30 minutes at about 300° F. to produce a cured coating layer about 25 microns thick. The coating layer of the Example 2 composition had a surprisingly smooth appearance compared to the Comparative Example A coating layer.

The viscosity profiles of the coatings during cure were determined using a Rheometric Scientific SR-2000 Rheometer (obtained from Rheometric Scientific, One Possumtown Rd, Piscataway, N.J.). The powder coating was tested by heating a sample according to the manufacturer's specifications up to 190° C. The viscosity vs. temperature data is shown in the graph of FIG. 1. As can be seen from the graphs, the powder coating of Comparative Example A exhibited a minimum G' of 553.29 Pa at 134.53° C., while the powder coating of Example 2 exhibited a significantly lower minimum G' of 266.79 Pa at 138.09° C. The graph also shows that the cure rates of the two powder coatings were comparable from about 150° C. on.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A powder coating composition, comprising
   at least about 0.1% by weight of a reaction product of an aminoplast and a compound having one carbamate group and no other groups reactive with the aminoplast and
   a solid, thermosettable material.

2. A powder coating composition according to claim 1, comprising up to about 40% by weight of the reaction product.

3. A powder coating composition according to claim 1, further comprising a crosslinker reactive with the thermosettable material.

4. A powder coating composition according to claim 1, wherein the powder coating particles are dispersed in a liquid medium.

5. A powder coating composition according to claim 4, wherein the liquid medium is aqueous.

6. A powder coating composition according to claim 4, wherein the liquid medium is thermosettable.

7. A powder coating composition according to claim 1, wherein the aminoplast is the reaction product of an activated amine selected from the group consisting of melamine, benzoguanamine, ureas, and carbamate functional materials reacted with an aldehyde selected from the group consisting of formaldehyde, acetaldehyde, crotonaldehyde, and benzaldehyde.

8. A powder coating composition according to claim 1, wherein the aminoplast is fully alkylolated.

9. A powder coating composition according to claim 1, wherein the aminoplast is fully etherified.

10. A powder coating composition according to claim 1, wherein the aminoplast is a fully etherified melamine-formaldehyde resin.

11. A powder coating composition according to claim 1, wherein the aminoplast is hexamethoxymethyl melamine.

12. A powder coating composition according to claim 7, wherein the activated amine is selected from the group consisting of 1,4-butanedicarbamate and 1,6-hexanedicarbamate.

13. A powder coating composition according to claim 7, wherein the activated amine is selected from polycarbamate compounds prepared by a step of reacting a first compound comprising at least one primary carbamate group and an active hydrogen group with a lactone.

14. A powder coating composition according to claim 13, wherein the active hydrogen group is an hydroxyl group.

15. A powder coating composition according to claim 14, wherein the polycarbamate compound is prepared by a second step of reacting the product of the first compound and the lactone with a second compound having a plurality of groups reactive with hydroxyl groups but not carbamate groups.

16. A powder coating composition according to claim 14, wherein the polycarbamate compound is prepared by a second step of reacting the product of the first compound and the lactone with one or more materials that convert the hydroxyl group on the reaction product to a carbamate group.

17. A powder coating composition according to claim 7, wherein the activated amine is selected from polycarbamate compounds having at least two carbamate groups and a hydrocarbon moiety with about 24 to about 72 carbon atoms.

18. A powder coating composition according to claim 1, wherein the compound having one carbamate group is selected from the group consisting of methyl carbamate, ethyl carbamate, and propyl carbamate.

19. A powder coating composition according to claim 1, wherein the reaction product has a softening point above about 40° C.

20. A method of coating a substrate, comprising: applying a powder coating composition according to claim 1 to the substrate and curing the applied composition to form a cured coating.

21. A method of coating a substrate according to claim 20, wherein the reaction product of the aminoplast and the compound having one carbamate group reacts into the cured coating.

22. A method of coating a substrate according to claim 20, wherein the substrate is selected from metal substrates and plastic substrates.

23. A method of coating a substrate according to claim 20, wherein the powder coating composition comprises powder coating particles dispersed in a liquid medium.

* * * * *